Patented Nov. 5, 1935

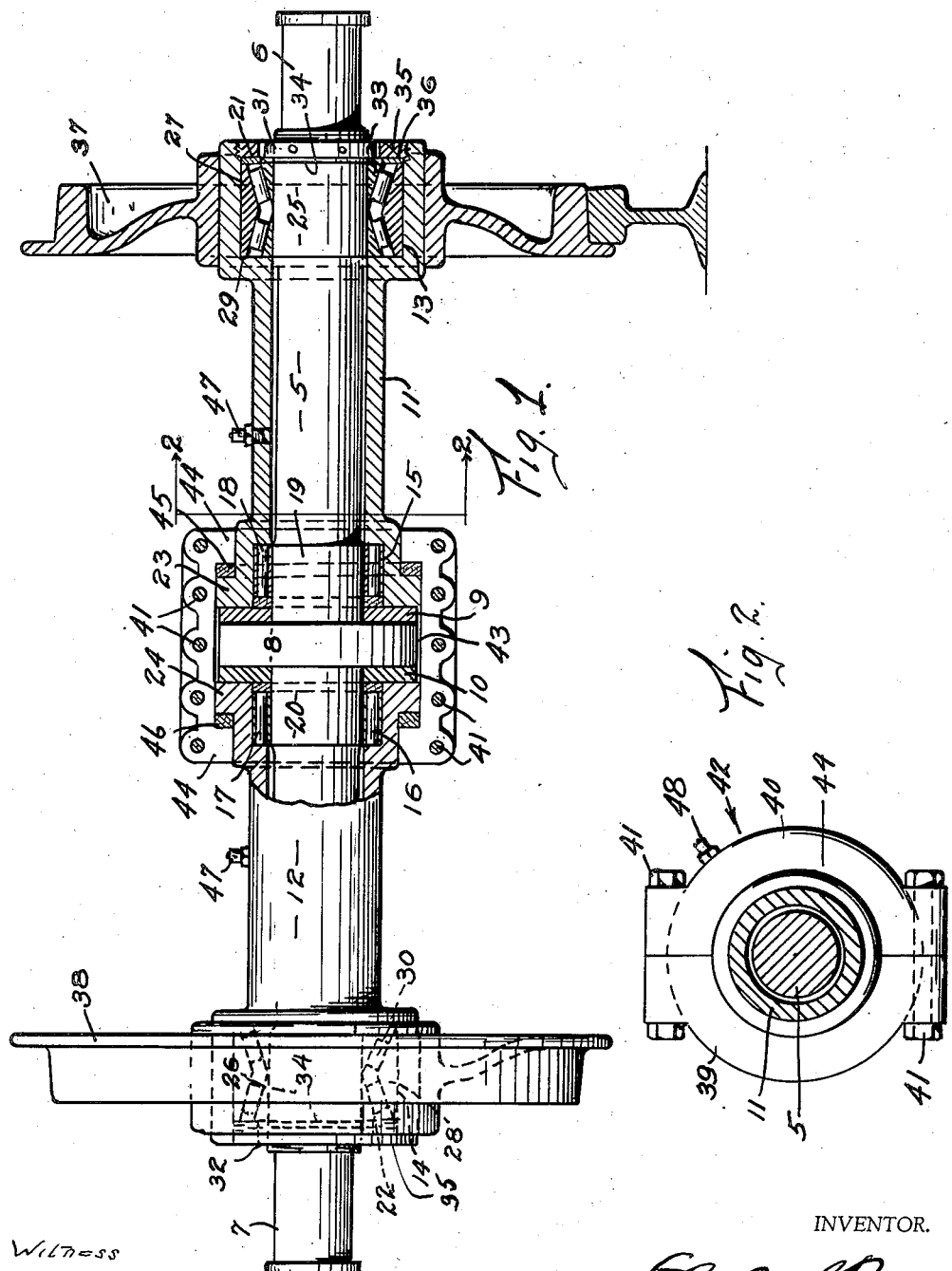

2,019,806

UNITED STATES PATENT OFFICE 2,019,806

VEHICLE AXLE

Luther S. Brown, Fresno, Calif.

Application January 22, 1934, Serial No. 707,832

2 Claims. (Cl. 295—39)

My invention relates primarily to axles for railroad cars and the like, although it is not limited to any specific type of vehicle, and it has for its object the provision of an axle so constructed and arranged as to operate in effect as a differential axle so that the wheels mounted thereon, one at each end, or near each end, or intermediate its ends may be rotated freely and independently of each other or both together in unison or in any other manner governed by the roadway over which the vehicle is moving, the wheels adapting themselves to the varying condition of the terrain and at the same time retaining their permanent alinement with each other and with the vehicle to which the device is attached.

Another object is to provide a device of the above character whereby, in use with cars or the like traveling on rails, the wheels carried by the axle will automatically adjust themselves to said rails and travel around curves etc., freely without slipping or friction or like interference.

Another object is to provide an axle which, when used with vehicles traveling on rails such as railroad cars and the like, will permit the wheels carried thereby to automatically adjust their speed of rotation to the varying arcs of curvature of the curves or bends in the rails while traveling around curves or bends in the rails thereby obviating slippage between the wheels and rails and doing away with the necessity for greasing of the rails periodically.

A still further object is to produce a device of the above character which while being comparatively cheap in construction will be of a maximum efficiency in operation with a minimum cost of upkeep and operation.

Other objects and advantages will appear hereinafter and while I have shown and will describe the preferred form of my invention, I wish it to be understood that I do not limit myself to such preferred form but that various changes and adaptations may be made therein without departing from the spirit of my invention.

In the drawing accompanying and forming a part hereof:

Fig. 1 is a central longitudinal section, partly in elevation, of an axle constructed according to my invention.

Fig. 2 is a section on the line 2—2 of Fig. 1.

Referring to the drawing 5 indicates an axle of the type usually used with railroad cars, having the journals 6 and 7 at opposite ends by means of which the axle is mounted within the usual axle boxes of the cars, not shown. Formed around the axle 5, centrally of its length and preferably integral is a collar 8, at each side of which are mounted anti-friction bearings or washers 9 and 10. Surrounding axle 5 on opposite sides of the collar 8, and extending from the bearings 9 and 10 to the inner termination of the journals 6 and 7 are rotatable sleeves 11 and 12. Formed in the outer ends of the sleeves 11 and 12 are annular concentric recesses 13 and 14 and formed within the inner ends of said sleeves are recesses 15 and 16 and in these recesses are mounted roller or other antifriction bearings 17 and 18, these rollers riding upon journals 19 and 20 formed on axle 5 at either side of the collar 8. The outer ends of the recesses 15 and 16 are closed by felt or similar packing washers 21 and 22 the purpose of which will be obvious.

Surrounding the inner ends of the sleeves 11 and 12 and concentric with the recesses 15 and 16 are integral flanges or collars 23 and 24 the outer diameters of which are slightly greater than the outer diameters of the collar 8. Formed in the axle 5 near the ends thereof, immediately adjacent the journals 6 and 7, are journals 25 and 26 and formed in the sleeves 11 and 12 to surround said journals 25 and 26, are bearing recesses 27 and 28 within which are adjustably mounted anti-friction bearings 29 and 30 of any suitable type but preferably of the type known as "Timken roller bearings". The extreme ends of the journals 25 and 26 are exteriorly screw threaded for the reception of the adjusting nuts 31 and 32 and provide means for adjusting the bearing cones 33 of the anti friction bearings 29 and 30 to compensate for wear. Provided between the nuts 31 and 32 and the bearing cones 33 are washers 34. The extreme outer ends of the bearing recesses 27 and 28 are interiorly screw threaded for the operative engagement of the annular nuts 35 and positioned within said recesses between said nuts 35 and the bearings 29 and 30 are felt, or other suitable dust washers 36. Rigidly mounted upon the outer ends of the sleeves 11 and 12, in any suitable manner are the wheels 37 and 38. These wheels 37 and 38 are rigidly connected to said sleeves to rotate therewith or they may be made integral with said sleeves if so desired or found necessary.

Surrounding the inner ends of the sleeves 11 and 12 and rotatably connecting the same is a housing preferably formed of two companion members or halves 39 and 40 divided lengthwise of said sleeves.

These two halves 39 and 40, when bolted together by means of the bolts 41 form a cylindrical housing 42 within which is provided an annular chamber 43. Housing 42 has provided at each end an inwardly depending flange 44 adapted to inclose the annular flanges or collars 23 and 24 of the sleeves 11 and 12 and hold the same against longitudinal movement relatively to each other and the collar 8 and at the same time permit free and independent rotation of said sleeves and collar relatively to each other in any direction. Anti-friction collars or similar anti-friction means 45 and 46 are provided within the housing 42 between collars 23 and 24 and the flanges 44. Oil or grease cups or nipples 47 and 48 are provided whereby a supply of oil or grease or other lubricant may be fed to the various parts of my axle requiring the same or any other suitable or desirable means may be adapted for the same purpose as found necessary or desirable.

By this construction I have provided a simple and efficient differential axle for railroad cars and other vehicles the wheels of which may rotate in unison or synchronously, may rotate in reversed directions relative to each other or may rotate at varying speeds relative to each other or a combination of any or the whole of the foregoing, thereby eliminating the necessity for periodically greasing the rails of curves and bends, materially lessening the power required in going around curves and practically eliminating the danger of wrecks through breakage of the axle or the wheels climbing the rails in going around curves, bends and the like.

Having described my invention what I claim is:

1. A device of the character described comprising a rotatable axle provided centrally of its length with an annular integral collar and a journal at each end, a pair of rotatable sleeves mounted on said shaft, one at each side of said collar and extending from the side of said collar to the innermost end of the adjacent journal, the ends of said sleeves terminating in annular recesses, antifriction bearings in said recesses, integral flanges surrounding the inner ends of each of said sleeves and coinciding with the collar of said axle, thrust bearings between the adjacent sides of said flanges and collar, a separable cylindrical housing surrounding said flanges and collar adapted for preventing relative movement therebetween lengthwise of said axle and to permit relative rotation therebetween, and a traction wheel rigidly mounted upon the outer end of each of said sleeves.

2. A device of the character described comprising a rotatable axle provided intermediate its length with an integral collar and a journal at each end, journals formed around said axle at each side of said collar and at the inner ends of each of said first journals, a pair of sleeves rotatably mounted on said axle one at each side of said collar and extending therefrom to the inner terminations of said first journals, the ends of said sleeves terminating in annular recesses surrounding the journals, anti-friction bearings in said recesses arranged for operative contact with the shaft journals, integral annular flanges surrounding the inner ends of said sleeves and coinciding with said collar, thrust bearings between the sides of said collar and said flanges, a separable cylindrical housing surrounding said flanges and collar, separable lengthwise, the ends of said housing being arranged for engagement with the outer sides of said sleeve flanges to prevent relative movement between said flanges and collar lengthwise of the axle and to permit relative rotation therebetween, means between said axle and the outermost anti-friction bearings for adjusting said bearings, and means to supply a lubricant to said axle and sleeves.

LUTHER S. BROWN.